US012632415B2

(12) United States Patent (10) Patent No.: US 12,632,415 B2
Das et al. (45) Date of Patent: May 19, 2026

(54) WEAK REFERENCES OF ALLOCATED LOGICAL CLUSTERS

(71) Applicant: Microsoft Technology Licensing, LLC, Redmond, WA (US)

(72) Inventors: Rajsekhar Das, Sammamish, WA (US); Gregory David Garbern, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/101,793

(22) Filed: Nov. 23, 2020

(65) Prior Publication Data

US 2022/0164311 A1 May 26, 2022

(51) Int. Cl.
*G06F 16/14* (2019.01)
*G06F 16/16* (2019.01)

(52) U.S. Cl.
CPC .......... *G06F 16/152* (2019.01); *G06F 16/164* (2019.01)

(58) Field of Classification Search
CPC .............................. G06F 16/152; G06F 16/164
See application file for complete search history.

(56) References Cited

U.S. PATENT DOCUMENTS

| | | | | | |
|---|---|---|---|---|---|
| 5,560,003 | A | * | 9/1996 | Nilsen | ................. G06F 12/0253 |
| 6,363,403 | B1 | * | 3/2002 | Roy | ................... G06F 12/0261 |
| 7,831,621 | B1 | * | 11/2010 | Banks | ................. G06F 21/6227 |
| | | | | | 707/790 |

| | | | | | |
|---|---|---|---|---|---|
| 8,156,306 | B1 | * | 4/2012 | Raizen | ................. G06F 3/0641 |
| | | | | | 711/202 |
| 8,930,306 | B1 | | 1/2015 | Ngo | |
| 9,152,502 | B2 | * | 10/2015 | Kalach | ............... G06F 11/1435 |
| 10,652,351 | B2 | | 5/2020 | Ueda | |
| 2011/0066628 | A1 | * | 3/2011 | Jayaraman | .......... G06F 16/1748 |
| | | | | | 707/758 |
| 2014/0006354 | A1 | | 1/2014 | Parkison et al. | |

(Continued)

FOREIGN PATENT DOCUMENTS

| | | | | |
|---|---|---|---|---|
| CN | 111651421 A | * | 9/2020 | ........... G06F 16/178 |

OTHER PUBLICATIONS

"International Search Report and Written Opinion Issued in PCT Application No. PCT/US21/056793", Mailed Date: Feb. 2, 2022, 11 Pages.

(Continued)

*Primary Examiner* — Khanh B Pham
*Assistant Examiner* — Faezeh Forouharnejad

(57) ABSTRACT

Aspects of the present disclosure relate to weak references of allocated logical clusters. In examples, a deduplication hash table stores associations between block hashes and block addresses, such that a block can be identified and used in place of another block storing the same data. A weak reference may be generated on a block, such that an intact weak reference indicates that the block is unchanged. When a block is identified that has a hash matching that of an existing block in the hash table, it may be determined whether a weak reference on the existing block is intact. If there is not an intact weak reference on the existing block, the existing block may have changed, such that it is not used for deduplication. By contrast, if the weak reference is intact, the existing block has not changed, such that it may be used for deduplication accordingly.

20 Claims, 10 Drawing Sheets

(56) References Cited

U.S. PATENT DOCUMENTS

| | | | | |
|---|---|---|---|---|
| 2014/0195632 | A1* | 7/2014 | Hunter ................... | G06F 9/544 |
| | | | | 709/213 |
| 2018/0074786 | A1 | 3/2018 | Oberbreckling et al. | |
| 2018/0113894 | A1 | 4/2018 | Raza et al. | |
| 2019/0334727 | A1 | 10/2019 | Kaufman | |
| 2020/0073797 | A1* | 3/2020 | Vaardal .............. | G06F 12/0826 |
| 2020/0159432 | A1 | 5/2020 | Sharma et al. | |

OTHER PUBLICATIONS

Keenan, Matt, XFS-Data Block Sharing (Reflink), Oracle Linux Blog, Jan. 6, 2020, blogs.oracle.com/linux/xfs-data-block-sharing-reflink.

"International Search Report and Written Opinion Issued in PCT Application No. PCT/US21/056793", Mailed Date: Feb. 2, 2022, 12 Pages.

Communication pursuant to Article 94(3) EPC, Received for European Application No. 21811192.0, mailed on Apr. 17, 2024, 12 pages.

Communication pursuant to Article 94(3) EPC, Received for European Application No. 21811192.0, mailed on Apr. 10, 2025, 05 pages.

Decision to grant a European patent pursuant to Article 97(1) EPC, Received for European Application No. 21811192.0, mailed on Oct. 30, 2025, 02 pages.

First Office Action received for Chinese Application No. 2021800784002, mailed on Sep. 29, 2025, 21 Pages (English Translation Provided).

Communication under Rule 71(3) EPC, Received for European Application No. 21811192.0, mailed on Jun. 24, 2025, 07 pages.

First Examination Report Received for Indian Application No. 202317033888, mailed on Mar. 9, 2026, 08 Pages. (English Translation Provided).

Wang, et al., "NV-Dedup: High-Performance Inline Deduplication for Non-Volatile Memory", In Journal of IEEE Transactions on Computers, vol. 67, No. 5, 2017, 14 pages.

Second Office Action Received for Chinese Application No. 202180078400.2, mailed on Mar. 21, 2026, 7 pages (English Translation Provided).

* cited by examiner

WEAK REFERENCES OF ALLOCATED LOGICAL CLUSTERS

BACKGROUND

Identifying and handling redundant data stored by a file system is resource-intensive and may introduce additional complexity to read and write operations. For example, various deduplication techniques may increase code complexity, reduce file system performance, and/or even result in data corruption if not properly implemented, among other detriments.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to weak references of allocated logical clusters. In examples, a deduplication hash table is used to store associations between block hashes and block addresses, such that a block can later be identified and used in place of another block storing the same data. A weak reference may be generated on a block when an entry for the block is added to the deduplication hash table. If the block is modified, the weak reference may be broken or otherwise removed. As a result, an intact weak reference may indicate that the block is unchanged and that an associated entry in the deduplication hash table is not stale.

When a block is identified that has a hash matching that of an existing block in the hash table, it may be determined whether a weak reference on the existing block is intact. If the weak reference is no longer intact (e.g., the weak reference was broken or removed), the data stored by the existing block may have changed, such that the existing block is not used for deduplication. By contrast, if the weak reference is intact, the data stored by the existing block has not changed, such that it may be used for deduplication accordingly.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
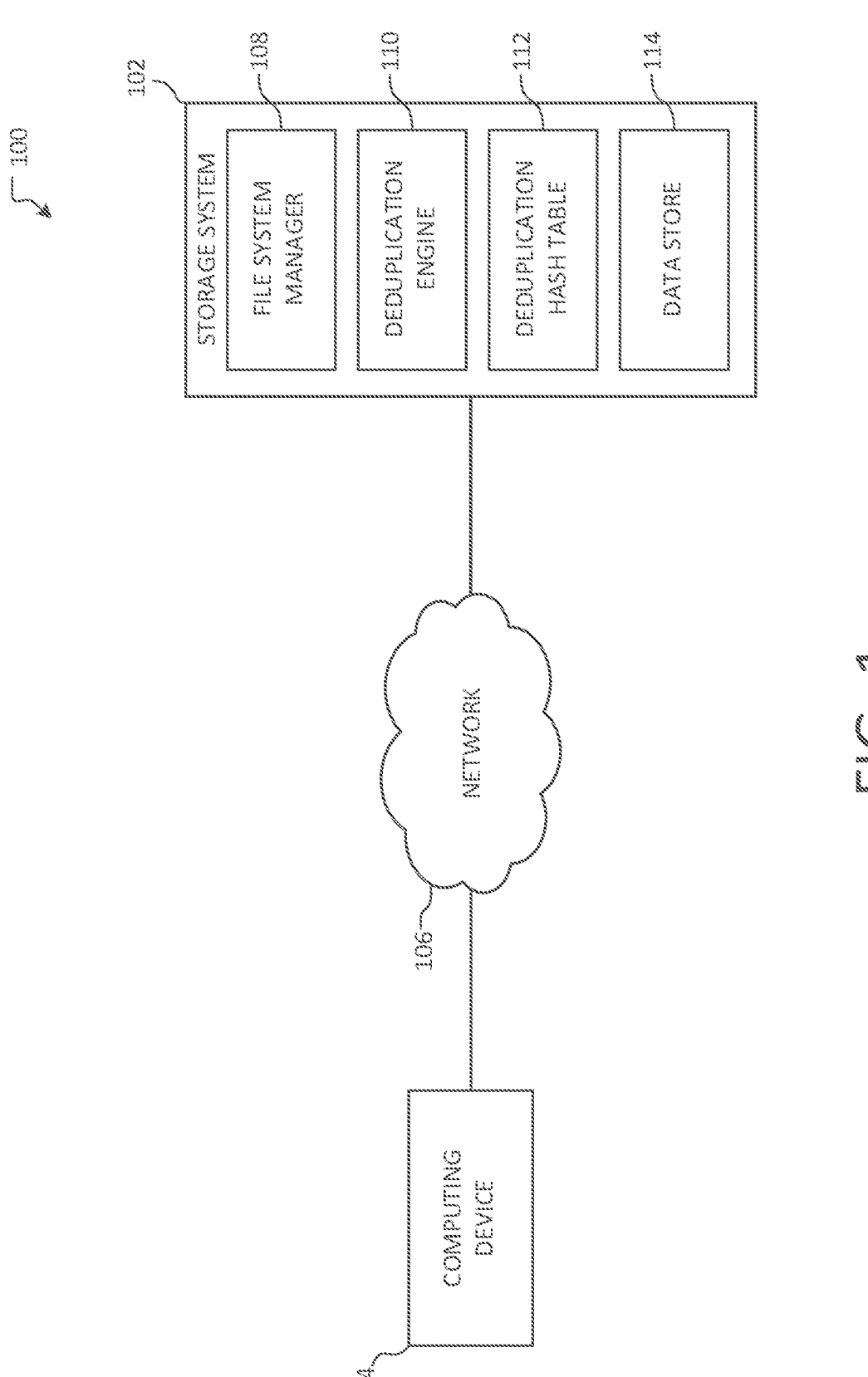
FIG. 1 illustrates an overview of an example system in which a weak reference of an allocated logical cluster may be used to perform data deduplication according to aspects described herein.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In examples, data deduplication techniques are used to identify and reduce the amount of redundant data stored by a file system. For example, a file may be a byte stream that is stored as a set of blocks or logical clusters of the file system. In some instances, one block of a first file stores the same data as another block of a second file. The block having the same data need not be at the same file-relative offset, such that the same data may exist at a first offset of the first file and a second offset of the second file. In such instances, rather than storing two blocks with the same data, the file system may instead store the data as a single, shared block. The shared block may be referenced by each representation of the respective file. Thus, the same logical cluster is used at least in part to store data common to both the first file and the second file. However, it may be difficult to accurately, reliably, and effectively identify such common blocks, update file metadata to reference a shared block, and further maintain multiple references to the shared block.

A hash table may be used for data deduplication, wherein the hash table stores associations between a hash value of the data of a block and the location of the block (e.g., a logical address of the block on a data store or a logical cluster number, among other examples). Accordingly, the hash table is used to identify data that is already stored by the file system, such that an existing block can be referenced rather than retaining a block that stores duplicate data. However, maintaining an up-to-date hash table usable to identify common blocks may be resource-intensive, as write operations may require the hash table to be updated contemporaneously. Additionally, performing "in-line" deduplication may require a large amount of processor utilization, memory utilization, and disk bandwidth to use and maintain the deduplication hash table as operations are processed by the file system. As another example, offline deduplication may be time-intensive, as blocks of the file system must first be hashed such that common blocks may be identified and subsequently replaced to reference shared blocks accordingly.

As such, aspects of the present disclosure relate to weak references of allocated logical clusters. As described herein, a file is comprised of a set of blocks, such that the file has a "strong" reference to its constituent blocks. A strong reference indicates that data stored by the block is at least part of a given file. Multiple files may each have a strong reference to the same block of a file system, while expecting changes to each copy of the file to be kept distinct; such a block is referred to herein as a shared block. In some instances, a reference count is maintained for a given block, which stores the number of strong references to the block. Thus, a shared block will have a reference count of at least two, thereby indicating that the shared block is associated with multiple files. In order to avoid data corruption, shared blocks may not be modified by a write operation associated with any of the referencing files, as a write operation for one associated file will result in data corruption of a second associated file by virtue of the shared block. Rather, such a write operation may instead cause a different block to be used, thereby maintaining the data of the shared block accordingly.

In contrast to a strong reference that indicates data stored by an associated block is in-use by a file and, in some instances, prevents modifications to the block, a "weak" reference may permit a write operation associated with the referenced block to proceed. Thus, such a block may have a strong reference count of "1" (i.e., having a single strong reference of an associated file) and may further have an associated weak reference. If the block is modified, the weak reference may be broken, while the strong reference associated with the file may be retained. In some instances, any change to a strong reference count of a block may cause a weak reference to be broken or removed. As another example, an operation that reduces a strong reference count of the block causes the weak reference to be broken or removed.

As a further example, an operation that causes a strong reference count to decrease below "2" causes the weak reference to be broken or removed. For example, the strong reference count may decrease to "1," thereby indicating that the block is no longer a shared block. As another example, the strong reference count may decrease to "0", indicating that the block may be freed. In some instances, breaking or removing a weak reference is additionally or alternatively conditioned on modification of the block. For example, a strong reference count may decrease below "2" and the block may further be overwritten, thereby causing an associated weak reference to be broken or removed. While example weak references described herein indicate a weak reference state for an associated block, it will be appreciated that a weak reference need not comprise a reference to the block with which it is associated.

For example, a weak reference may be an entry in a data structure that stores an association between the block (e.g., as may be identified by a logical address or other identifier) and a weak reference state for the block. The weak reference state represents the state of the block at the time the weak reference was created, such that the weak reference can only be intact while the block is unchanged. Accordingly, if the state of the block is going to change (e.g., as a result of an in-place write), the weak reference is first broken or removed to indicate that the block is no longer in the state when the weak reference was created.

As noted above, a deduplication hash table may be used, which stores a hash value of data stored by a block in association with the location of the block. It will be appreciated that any of a variety of techniques may be used to hash block data, including, but not limited to, a secure hash algorithm (SHA), such as SHA-1 or SHA-2, or a message-digest (MD) algorithm, such as MD5. The hash table may then be used to identify and subsequently use shared blocks to represent files stored by the file system rather than storing blocks having duplicate data.

According to aspects of the present disclosure, when a mapping is added to the hash table, a weak reference may be taken on an associated block. In some instances, the block may be locked during hashing or, as another example, the weak reference may be taken prior to hashing and may subsequently be verified to be intact after hashing, thereby confirming that the hash and associated weak reference represent the data stored by the block at that time. As a result, when a new block is identified that has a hash that matches an entry in the deduplication hash table, an existing block associated with the hash is evaluated to determine whether the weak reference is intact or has been broken. In instances where the weak reference is broken (or does not exist), it is no longer ensured that the existing block stores the same data, such that the existing block is not used in place of the new block. By contrast, if the weak reference is intact, it is ensured that the data of the block has not changed, such that the existing block may be a suitable replacement for the new block. As a result, a strong reference may be generated on the existing block and used in place of the new block, thereby yielding a shared block. Thus, the existence of a valid weak reference is indicative that data at an associated block has not change, such that the block may be used to perform deduplication.

As compared to alternate in-line deduplication techniques, the hash table need not be maintained contemporaneously with file system operations, thereby reducing overhead associated with deduplication. Additionally, as compared to alternate offline deduplication techniques, a new hash table need not be generated for each instance of offline processing, as it is instead possible to determine which blocks have changed and, by extension, which entries in the deduplication table are no longer valid. Further, deduplication may be performed online (e.g., while the file system is in use and/or write operations are occurring), as an intact weak reference confirms that data stored by an existing block has not changed.

As compared to techniques where a lock may be held from hashing through deduplication, using an intact weak reference to the block may reduce the amount of time that the block is locked. Similarly, the file system itself need not be in a read-only state. As another example, a block may instead be rehashed immediately prior to deduplication to ensure that the block has not changed. However, hashing may be computationally expensive, especially as compared to determining whether a weak reference is intact according to aspects described herein. Thus, rather than preventing or identifying changes to a block via immutability or rehashing, respectively, an intact weak reference ensures that the block has not changed (e.g., since the block was hashed), such that the block can be used for deduplication and shared between multiple files accordingly. Further, such alternatives may negatively impact performance (e.g., preventing writes to certain blocks or resulting from increased disk utilization for rehashing) or, in their absence, may cause a changed block to be mistakenly used for deduplication, resulting in data corruption.

In some instances, the data structure used by a file system to maintain a reference count for strong references may further be used to take and otherwise maintain a weak reference. For example, the file system may use two bytes to represent a reference count for a block, wherein at least a subset of the bits may be used for a weak reference in addition to those used for a strong reference count. As an example, 13 lower bits of the 16 bits may be used to track a number of strong references, while the upper three bits may be used for a weak reference. A weak reference may have a variety of states, as may be represented by the by the subset of bits associated with the weak reference. Example states include, but are not limited to, a state indicating there is no weak reference, a state indicating a valid weak reference, and a state indicating a broken weak reference. In an example where three bits are used, each bit may have an associated state (e.g., "100" indicates no reference, "010" indicates a valid or intact reference, and "001" indicates a broken reference). As another example, two bits may be used, wherein "10" indicates no reference, "01" indicates a valid reference, and "11" indicates a broken reference. In other instances, the data structure may alternatively or additionally represent a number of weak references (e.g., similar to the strong reference count described herein). Thus, a weak reference may be represented using any of a variety of techniques.

It will be appreciated that while a broken reference state is described herein, alternative examples may omit the broken reference state and may instead use a state indicating that there is no weak reference. However, broken weak references may aid in maintaining a deduplication hash table, as a broken weak reference provides an indication that a stale entry is present in the deduplication hash table, such that the entry may be identified and either updated or removed. As an alternative, a cleanup operation may be performed to identify and remove stale entries in the deduplication hash table in instances with or without a broken reference state. The deduplication hash table may comprise a two-way association between block hashes and block locations, such that the hash table is not only usable to determine existing blocks based on a hash, but is further usable to identify hash table entries based on a block location. In other instances, multiple hash tables or other data structures may be used.

FIG. 1 illustrates an overview of an example system 100 in which a weak reference of an allocated logical cluster may be used to perform data deduplication according to aspects described herein. As illustrated, system 100 comprises storage system 102, computing device 104, and network 106. In examples, storage system 102 and computing device 104 communicate using network 106, which may comprise a local area network, a wireless network, or the Internet, or any combination thereof, among other examples.

Storage system 102 may a computing device, such as a server computing device or a set of computing devices that form a distributed computing device, among other examples. Computing device 104 may also be any of a variety of computing devices, including, but not limited to, a desktop computing device, a mobile computing device, a laptop computing device, or a tablet computing device. It will be appreciated that while system 100 is illustrated as comprising one storage system 102 and one computing device 104, any number of such elements may be used in other examples. Further, while system 100 is illustrated as client device 104 accessing storage system 102 via network 106, it will be appreciated that, in other examples, similar techniques may be utilized for storage local to computing device 104. For example, at least a part of the functionality described herein with respect to storage system 102 may be additionally or alternatively be implemented by computing device 104.

Computing device 104 communicates with storage system 102 via network 106 to perform file operations associated with data store 114. For example, computing device 104 may access a file, modify a file, or create a new file stored by data store 114. Storage system 102 comprises file system manager 108, deduplication engine 110, deduplication hash table 112, and data store 114. Accordingly, file system manager 108 manages operations performed by computing device 104, as they relate to a file system of data store 114. For example, file system manager 108 may read blocks, allocate blocks, modify blocks in-place, and delete blocks of data store 114.

When a block of data store 114 is updated, deleted, or otherwise modified, file system manager 108 may remove an associated weak reference. Thus, an operation to change a block of data store 114 (e.g., modification of the block, an intent to modify the block, etc.) causes an intact weak reference to be broken or otherwise removed, thereby ensuring that an intact weak reference remains intact only if the block is unchanged. For example, file system manager 108 may determine a weak reference exists for the block, such that the weak reference may be updated to a broken weak reference. As another example, file system manager 108 updates the weak reference to reflect a state that indicates no weak reference is present for the block. As described above, such aspects may comprise updating a reference count data structure accordingly.

In examples, file system manager 108 provides block cloning functionality, such that multiple files may reference the same block (e.g., each using a strong reference). For example, if a user of computing device 104 indicates that a target file of data store 114 should be copied, file system manager 108 may create a second copy, wherein the second copy is comprised of one or more strong references to the blocks that are associated with the target file.

Deduplication engine 110 maintains deduplication hash table 112. For example, deduplication engine 110 may initially process data store 114 to generate deduplication hash table 112, where allocated blocks of data store 114 are processed to generate a mapping of hashes and associated block locations according to aspects described herein. Deduplication engine 110 may take weak references on blocks of data store 114 during such processing. As an example, deduplication engine 110 utilizes application programming interface (API) of file system manager 108 to take a weak reference on a block of data store 114, thereby causing file system manager 108 to update a reference count data structure or other file system metadata associated with the block. As discussed above, a block may be locked during the hashing process (and released after the hash is generated). As another example, the weak reference may be taken prior to hashing and subsequently verified after hashing to confirm that the block was unchanged during hashing. In other examples, deduplication engine 110 may itself update metadata of data store 114 in addition to or as an alternative to using the API of file system manager 108.

If deduplication engine 110 generates a hash for data stored by a first block that is already present in deduplication hash table 112 (e.g., where the existing hash relates to a second block), deduplication engine 110 may generate an indication to file system manager 108 to utilize a strong reference to the second block in place of the first block, thereby freeing the first block rather than retaining duplicate data in data store 114. In examples, deduplication engine 110 may lock the second block and determine whether a weak reference on the second block is intact prior to providing the indication to file system manager 108. Deduplication engine 110 may further lock the first block and confirm whether a weak reference on the first block is intact. Thus, as a result of locking the first block and the second block, deduplication engine 110 is assured that neither block changes after confirming the associated weak references are intact. Deduplication engine 110 may unlock the blocks after the deduplication operation succeeds (e.g., as may be indicated by file system manager 108). It will be appreciated that, in other examples, file system manager 108 may lock blocks and verify associated weak references in addition to or as an alternative to deduplication engine 110, as discussed below. If weak references to the first block and/or the second block are not intact, the indication is not provided to file system manager 108, as data at one or more blocks may have changed such that deduplication hash table 112 is not current.

In other instances, file system manager 108 may additionally or alternatively lock the first block and the second block prior to verifying weak references associated therewith to ensure that data stored by either block does not change. Once file system manager 108 verifies the associated weak references, file system manager 108 may perform a deduplication operation accordingly, thereby using a strong reference to the second block in place of the first block and freeing the first block rather than retaining duplicate data in data store 114. File system manager 108 may then unlock the first and second blocks accordingly.

It will be appreciated that locking a block according to aspects described herein need not prevent changes to a file associated with the block, such that the lock causes the file itself to be locked. Rather, in some examples, a modification operation associated with the file may instead cause a strong reference to the locked block to be broken and a new block with which to represent the file may be allocated and referenced instead (e.g., an allocate-on-write operation). Thus, the modification operation may succeed with respect to the file, even while the initial block is locked. As a result, the reference count of the initial block may be decremented to reflect that the file no longer has a strong reference to the block, as the file now instead references the newly allocated block. However, as a result of a deduplication operation according to aspects disclosed herein, the initial block may ultimately be referenced by another file via a strong reference, such that the reference count of the initial block is incremented accordingly and therefore remains nonzero.

As another example, a strong reference count associated with a block may be incremented as an alternative or in addition to the locking techniques described above. As an example, a strong reference count for the first block and a strong reference count for the second block may each be incremented. For example, file system manager 108 may provide an API to increment an associated strong reference count or, as another example, block cloning functionality may be used (e.g., by associating the first and second blocks with a temporary file). A resulting strong reference count of "2" or greater will cause similar allocate-on-write behavior as described above to occur in response to an associated modification operation. Similarly, a resulting strong reference count of "1" indicates that there were no other strong references to the block, such that modification may not occur to the block and the newly added strong reference further prevents the block from deallocation. Thus, a strong reference may be used as an alternative to locking in order to similarly ensure that a block won't be modified or deallocated, for example during a hashing and/or deduplication operation. As such, it will be appreciated that while examples are described herein as using locks, such strong reference techniques may similarly be applied to limit modification of blocks during deduplication.

Thus, deduplication engine 110 may be a user mode service of storage system 102, such that deduplication engine 110 utilizes an API of file system manager 108 to replace a duplicate block with a strong reference to an existing block according to aspects described herein. For example, deduplication engine 110 may utilize weak references, block cloning functionality, and associated APIs of file system manager 108 to maintain deduplication hash table 112 and to identify duplicate blocks of data store 114 and cause the duplicate blocks to be processed accordingly.

Deduplication engine 110 may also generate, regenerate, or update deduplication hash table 112 periodically or in response to one or more events, among other examples. For example, deduplication engine 110 may update deduplication hash table 112 when resource utilization is below a predetermined threshold or according to a schedule. As noted above, file system manger 108 may update a weak reference to a broken state or may remove the weak reference when an associated block is modified. Accordingly, deduplication engine 110 may process new and changed blocks to update deduplication hash table 112 such that stale entries are removed or updated (e.g., as may be identified based on broken weak references), and new entries are added. For example, deduplication hash table 112 may identify changed blocks based at least in part on a snapshot that was taken when deduplication hash table 112 was last updated. It will be appreciated that any of a variety of techniques may be used to identify changed blocks of data store 114 without departing from aspects described herein.

In some instances, while intent to modify a block is sufficient to break or otherwise remove a weak reference, file system manger 108 may commit such changes to data store 114 in a way that the block modification is not written contemporaneously with removal of a weak reference to reflect that the block has changed. For example, file system manager 108 may break a weak reference in memory when a write to an associated block is received or otherwise identified. File system manager 108 may create a journal entry indicating that the weak reference was broken. The block may further be modified in-memory, and then ultimately flushed to data store 114.

However, in instances where there is a failure (e.g., storage system 102 crashes, there is a power failure, or access to data store 114 is unexpectedly terminated), the weak reference may have been broken in memory but may not yet be broken in data store 114. As noted above, file system manager 108 may generate an associated journal entry that indicates the weak reference should be broken. Accordingly, the journal entry may be replayed after the failure is resolved to ensure that the weak reference is broken or removed in data store 114. As such, a weak reference for a block may be broken, even if the block did not change (e.g., regardless of whether an associated modification operation successfully completed prior to or during the failure), thereby ensuring data corruption does not occur.

Additionally, it may be determined whether data store 114 supports write durability, without which the journal itself may not be correctly or completely stored for access after failure resolution. In instances where data store 114 does not support write durability, an unplanned shutdown or other unexpected failure has occurred, and/or it is determined that a journal entry is incorrect (e.g., the journal entry may fail a checksum), at least a part of deduplication hash table 112 may be purged so as to avoid incorrectly deduplicating data of data store 114. Returning to the above example, if a journal entry indicates a weak reference should be broken or removed, the weak reference state may be updated accordingly regardless of whether the block was changed, thereby ensuring the block is not incorrectly used for deduplication. In such instances, deduplication engine 110 may regenerate at least a part of deduplication hash table 112 accordingly.

Figure 2A:
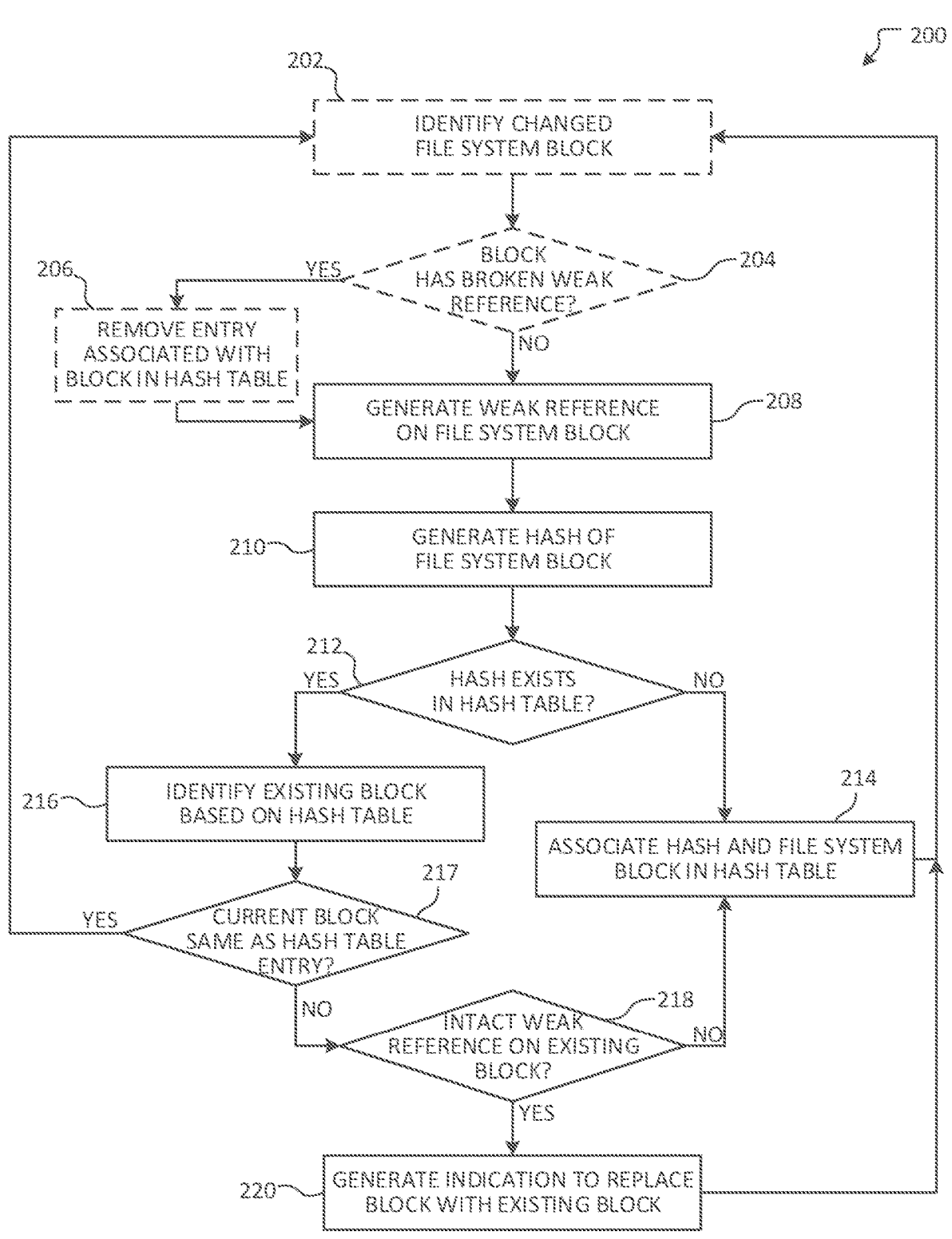
FIG. 2A illustrates an overview of an example method for processing a file system block based on a weak reference of an allocated logical cluster.

FIG. 2A illustrates an overview of an example method 200 for processing a file system block based on a weak reference of an allocated logical cluster. In examples, aspects of method 200 are performed by a storage system, such as storage system 102 in FIG. 1. For example, a deduplication engine such as deduplication engine 110 may perform such aspects. Method 200 may iterate through blocks to generate or update a deduplication hash table, such as deduplication hash table 112 in FIG. 1.

The deduplication engine may be a user mode service that utilizes an API of a file system manger (e.g., file system manager 108 in FIG. 1). In other examples, such aspects need not be implemented as a user mode service and may instead be implemented in kernel mode or at least a part of such functionality may be integrated into the file system manager. Similarly, aspects described herein with respect to the file system manager may instead be implemented as part of a user mode service, among other examples.

Method 200 begins at operation 202, where a changed file system block is identified. The block may have changed since a previous execution of method 200. In examples, a file system manager such as file system manager 108 in FIG. 1 provides an indication as to one or more changed blocks or, as another example, a snapshot is evaluated to identify changes that have occurred since the snapshot. Thus, it will be appreciated that any of a variety of techniques may be used to identify the changed file system block.

At determination 204, it is determined whether the block has a broken weak reference with which it is associated. In examples, the determination comprises evaluating a reference count associated with the block. In other examples, the determination comprises using an API associated with a file system manager to determine a weak reference state for the block (e.g., no weak reference, an intact weak reference, or a broken weak reference, among other examples).

If it is determined that a broken weak reference exists for the block, flow branches "YES" to operation 206, where an entry associated with the block is removed from a deduplication hash table (e.g., deduplication hash table 112 in FIG. 1). In some instances, the hash table provides a mapping between block locations and hashes, such that the entry may be identified using a location of the block accordingly. Flow progresses to operation 208, which is discussed below.

If, however, it is determined that the block does not have a broken weak reference (e.g., the block has no associated weak reference), flow instead branches "NO" to operation 208. Operations 202-206 are illustrated using dashes to indicate that, in some examples, such aspects may not be performed. For example, if an implementation of the disclosed weak reference functionality does not provide a broken state and instead provides an intact weak reference state and a no weak reference state, operations 204-206 may be omitted. In such instances, the deduplication hash table may be processed periodically to remove stale hashes. As another example, operation 202 may be omitted by processing all blocks, or a subset of available blocks, regardless of whether they have changed.

Flow arrives at or, as noted above, may begin at operation 208 in other examples, where a weak reference is generated to the file system block. The weak reference may be generated using an API call to a file system manager, such as file system manager 108 in FIG. 1, thereby causing a reference count associated with the block to be updated to reflect the weak reference accordingly. While examples are described with respect to updating a reference count (which, in some examples, may also be used to reflect one or more strong references to the block), it will be appreciated that any of a variety of other techniques may be used. For example, a block may have an associated weak reference property or a separate data structure may store entries that indicate weak references for file system blocks accordingly.

Flow progresses to operation 210, where a hash is generated based on the data stored by the file system block. It will be appreciated that any of a variety of techniques may be used to hash block data, including, but not limited to, SHA-1, SHA-2, or MD5. In other examples, a pre-existing hash associated with the block may be used. For example, the file system may checksum blocks to ensure data integrity, and such a checksum may further be usable as a hash of the block data in some instances.

At determination 212, it is determined whether the hash exists in a hash table, such as deduplication hash table 112 in FIG. 1. Keys of the hash table may be block hashes, such that the determination comprises attempting to retrieve a value from the hash table using the block hash that was generated at operation 210. If no value is returned, it may be determined that the hash does not exist in the hash table.

Accordingly, if it is determined that the hash does not exist in the hash table, flow branches "NO" to operation 214, where an association is generated between the block hash and the file system block. In examples, the hash is used as a key for the hash table entry, while a logical address or other identifier for the file system block is used as the value. It will be appreciated that any of a variety of other techniques may be used to generate an entry in the deduplication hash table. For example, if a handle is generated to the block as a result of generating the weak reference at operation 208, the handle may be stored in association with the generated hash. Flow then returns to operation 202 (or, in other examples, operations 204 or 208), such that an additional block of the file system may be processed according to method 200.

If, however, it is instead determined at determination 212 that the hash exists in the hash table, flow branches "YES" to operation 216, where an existing block is identified using the hash table. For example, the value associated with the block hash in the hash table may identify or otherwise reference the existing block (e.g., using an address or a handle). As noted above, any of a variety of other techniques may be used to associate a block hash with a block such that the association may be used to identify the block using the block hash.

At determination 217, it is determined whether the current block (e.g., the one identified at operation 202) is the same block as the entry in the hash table (e.g., as determined at determination 212). For example, when re-using an existing hash table or a block is indicated as having changed more than once, the hash table may have an entry in the hash table for the block. Accordingly, if it is determined that the current block is the same block as the entry in the hash table, flow branches "YES" to operation 202.

By contrast, if it is instead determined that the current block is not the same block as the entry in the hash table, flow instead branches "NO" to determination 218, where it is determined whether there is an intact weak reference on the existing block. For example, the existing block may have been processed according to a previous iteration of method 200, such that a weak reference was generated according to aspects of operation 208. However, if the existing block was since modified, the weak reference may have been broken or removed. Accordingly, determination 218 may comprise using an API call to the file system manager to determine whether the weak reference is still intact. In other examples, determination 218 comprises accessing a reference count data structure associated with the block to determine a weak reference state indicated by the reference count data structure.

If, at determination 218, it is determined that the weak reference is not intact (e.g., that it has since been broken or no longer exists), flow branches "NO" to operation 214, which was discussed above. Thus, if it is possible that the block hash in the deduplication hash table no longer accurately reflects the state of the data stored by the block, the existing block is not used to perform deduplication. Rather, the block currently being processed by method 200 (e.g., as was hashed at operation 210) is added to the deduplication hash table such that it may be used to perform deduplication if a different block having its hash is identified in the future.

If, however, it is determined that the weak reference on the existing block is intact, flow instead branches "YES" to operation 220, where an indication is generated to replace the block with the existing block. In examples, the indication is provided to the file system manager using an API call (thereby causing aspects of method 250 of FIG. 2B to be performed, as discussed below). In some instances, determination 218 may be omitted such that flow proceeds directly to operation 220 from determination 217. For example, a file system manager may instead verify weak references on both existing and new blocks, as discussed below. It will be appreciated that while aspects of method 200 are described with respect to an API provided by a file system manager, similar techniques may be more directly applied to file system metadata. For example, operation 220 may instead comprise generating a strong reference to the existing block and updating metadata of a file using the strong reference to the existing block accordingly. Such aspects may be similar to those of method 250 of FIG. 2B. Similar to operation 214, flow may then return to operation 202 (or, in other examples, operation 208), such that another block may be processed according to method 200.

Figure 2B:
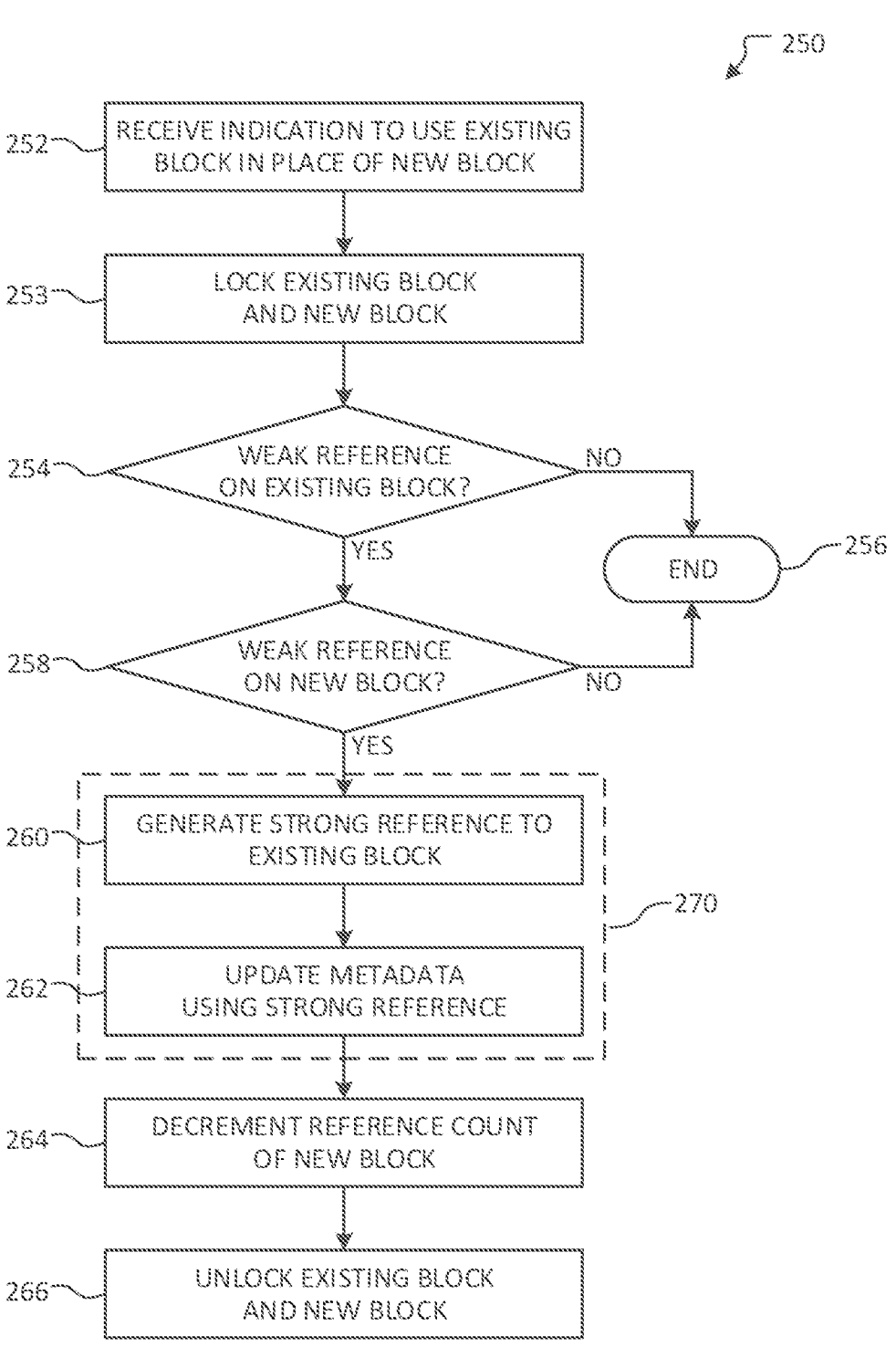
FIG. 2B illustrates an overview of an example method for performing data deduplication of a file system block based on a weak reference of an allocated logical cluster.

FIG. 2B illustrates an overview of an example method 250 for performing deduplication of a file system block based on a weak reference of an allocated logical cluster. In examples, aspects of method 250 are performed by a storage system, such as storage system 102 in FIG. 1. For example, a file system manager such as file system manager 108 may perform such aspects. As described above, the file system manager may provide an API that is used by a deduplication engine (e.g., deduplication engine 110 in FIG. 1) performing aspects of method 200 in FIG. 2A. In other examples, such aspects need not be implemented by a file system manager and such functionality may be integrated into a deduplication engine (e.g., in user mode and/or kernel mode).

Method 250 begins at operation 252, where an indication is received to use an existing block in place of a new block. For example, the indication may be received as a result of performing aspects of operation 220 discussed above with respect to FIG. 2A. In some instances, the indication comprises an address, handle, or other identifier for each the existing block and the new block.

Flow progresses to operation 253, where the existing block and the new block are locked, thereby ensuring that data stored by either block does not change during the deduplication operation. While associated weak references indicate that the data has remained unchanged in the interim between hash generation (e.g., operation 210 of method 200 in FIG. 2A) and identifying the blocks as deduplication candidates (e.g., determinations 212 and 217), operation 253 may be performed to ensure that a race condition does not exist whereby data of either block is changed when replacing a strong reference to the new block with a strong reference to the existing block.

As noted above, a lock generated on either the existing block or the new block need not prevent modification operations to a file associated therewith. For example, other blocks associated with a file may be modified as normal without regard for the deduplication operation. Additionally, a modification to either the normal or the existing block may instead cause a strong reference to the corresponding block to be broken and another block may be allocated accordingly (e.g., as part of an allocate-on-write operation). In other examples, such modification operations may instead be trapped or temporarily suspended such that they are retried or resumed once the deduplication operation is complete (e.g., as part of operation 266 discussed below).

In other examples, operation 253 may instead comprise incrementing a strong reference count of each of the existing block and new block. As discussed above, a resulting strong reference count of "2" or greater will cause a new block to be allocated (e.g., according to the allocate-on-write techniques described above) in response to an associated modification operation, such that a file associated with the block may be modified using the newly allocated block. Similarly, a resulting strong reference count of "1" indicates that there are no other strong references to the block, such that modification may not occur to the block and the strong reference further prevents the block from deallocation. As an example where each block is associated with one file, both the strong reference count for the existing block and the new block may each be incremented from "1" to "2." Thus, certain examples of method 250 may reduce or even avoid utilizing locks during deduplication.

At determination 254, it is determined whether there is an intact weak reference on the existing block. For example, if the existing block was modified since a weak reference was generated, the weak reference may have been broken or removed. Determination 254 may comprise accessing a reference count or other data structure associated with the existing block to determine a weak reference state associated with the existing block. While method 250 is illustrated as locking the existing and new blocks and subsequently verifying associated weak references, it will be appreciated that, in other examples, such aspects may be performed as part of method 200 in FIG. 2A. For example, determination 218 may further comprise locking the existing block as part of determining whether an associated weak reference is intact, and may further comprise locking the new block and verifying its associated weak reference as well. Thus, locking and weak reference verification may be performed by a file system manager, a deduplication engine, or any combination thereof.

If it is determined that the weak reference on the existing block is not intact (e.g., that it has since been broken or no longer exists), flow branches "NO" and ends at operation 256. Operation 256 may further comprise unlocking the existing block and new block, as no deduplication operation of the blocks will be performed. Similarly, in examples where strong reference counts were incremented at operation 253, strong reference counts associated with the existing block and new block may each be decremented accordingly (e.g., returned to "1" in the above example). Thus, if it is possible that the deduplication hash table no longer accurately reflects the state of the data stored by the existing block, deduplication does not occur.

If, however, it is instead determined that the weak reference on the existing block is intact, flow instead branches "YES" to determination 258, where it is determined whether a weak reference on the new block is intact. Similar to determination 254, data stored by the new block may have changed, such that referencing the existing block instead of the new block would result in data corruption. As an example, determination 258 may comprise accessing a reference count or other data structure associated with the new block to determine a weak reference state associated with the new block.

If it is determined that the weak reference on the new block is not intact (e.g., that it has since been broken or no longer exists), flow branches "NO" and ends at operation 256. Thus, if it is possible that the deduplication hash table no longer accurately reflects the state of the data stored by the new block, deduplication does not occur.

By contrast, if it is instead determined that the weak reference on the new block is intact (and, as discussed above, the weak reference on the existing block is also intact), flow branches "YES" to operation 260, where a strong reference is generated to the existing block. Aspects of operation 260 may comprise incrementing a reference count associated with the existing block to indicate that the existing block is now a shared block (e.g., the existing block will be referenced in place of the new block). In instances where strong reference counts were incremented at operation 253, the incremented strong reference count on the existing block may be retained (e.g., at "2" in the above example) rather than further incrementing the strong reference count at operation 260. Thus, if the existing block was previously used to represent part of a first file (thereby having a reference count of "1" prior to method 250), the strong reference generated at operation 260 updates the reference count to indicate that the existing block is now further in use to represent part of a second file (now having a reference count of "2"). As discussed above, this indicates that the existing block is now a shared block, such that the block is not modified as a result of an operation relating to either the first file or the second file, which may result in data corruption of the other file. Rather, the increased reference count ensures that changes to each associated file are kept distinct.

At operation 262, metadata relating to the file with which the new block is associated is updated using the strong reference that was generated at operation 260. For example, the metadata is updated such that, rather than referencing the new block, the metadata instead references the existing block. Operations 260 and 262 are illustrated using dashed box 270 to indicate that, in some examples, such aspects may be performed utilizing block cloning functionality of a file system manager, where an existing block is used to represent the data of multiple files. In instances where a modification operation is trapped or suspended, an indication may be generated to retry the modification operation or the modification operation may be resumed, among other examples.

Flow progresses to operation 264, where the reference count of the new block is decremented, as the file with which the new block was previously associated no longer references the new block. Thus, in some instances, the new block may be deleted or otherwise freed to store additional data, as may be the case if the new block was referenced solely by the above-discussed file (such that the updated reference count is "0"). In the above example where operation 253 comprises incrementing an associated strong reference count, operation 264 may yield a strong reference count for the new block that is decremented from "2" to "1." As another example where a lock is used at operation 253 and the new block is referenced by a single file, the reference count may be decremented from "1" to "0." In other instances, the new block may be retained, as may be the case if the updated reference count remains non-zero.

At operation 266, the existing block and the new block are unlocked. For example, in instances where the reference count of the new block has a reference count of "1," the new block may be modified accordingly. As another example, if the reference count of the new block is "0," the new block may be overwritten. In a further example, the existing block may have a reference count of "1" such that it may be modified, as may be the case when a modification operation to an associated file occurs during the deduplication operation. As a result, the file may instead reference a newly allocated block rather than the existing block.

In instances where strong reference counts were incremented at operation 253, operation 266 may comprise further decrementing a strong reference count associated with the new block. As noted above, the incremented strong reference count of the existing block is retained at operation 260, as the existing block is now referenced in place of the new block. However, the strong reference count of the new block was first decremented at operation 264 to indicate that the new block is no longer referenced by an associated file, such that the strong reference count is further decremented at operation 266 to account for the increment performed at operation 253. Thus, returning to the above example, the strong reference count for the new block was decremented from "2" to "1" at operation 264, and is further decremented to "0" at operation 266. As noted above, trapped or temporarily suspended modification operations may be retried or resumed as part of operation 266. Flow terminates at operation 266.

Figure 3:
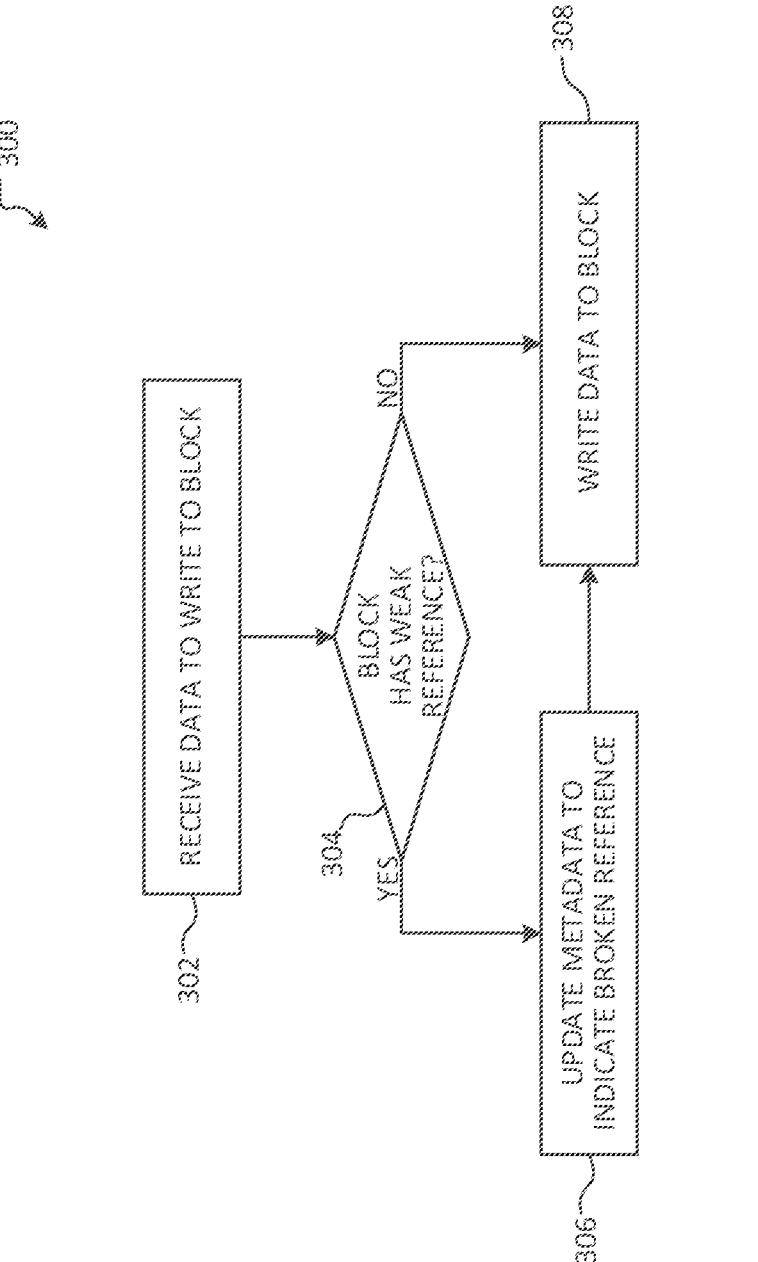
FIG. 3 illustrates an overview of an example method for writing data to a file system block according to aspects of the present disclosure.

FIG. 3 illustrates an overview of an example method 300 for writing a file system block according to aspects of the present disclosure. In examples, aspects of method 300 are performed by a storage system, such as storage system 102 in FIG. 1. For example, a file system manager such as file system manager 108 may perform such aspects. Method 300 begins at operation 302, where data to write to a block is received. In examples, an address at which to write the data is also received, as may be the case when performing an in-place modification of data stored by a given block. In other examples, a block is determined from a set of available or otherwise unallocated blocks.

Flow progresses to determination 304, where it is determined whether the block has a weak reference. Determination 304 may comprise accessing a reference count or other data structure associated with the block to determine a weak reference state associated with the existing block. For example, the three most significant bits of a reference count may be accessed and evaluated to determine whether there is an intact weak reference state associated with the block.

If it is determined that the block has an intact weak reference, flow branches "YES" to operation 306, where the metadata is updated to indicate that the weak reference is broken. Returning to the above example, the three most significant bits of the reference count may be updated to indicate a broken weak reference state. In other examples, a property associated with the block may be updated accordingly. Thus, it will be appreciated that any of a variety of techniques may be used to determine whether the block has an associated weak reference and to update the weak reference state accordingly. In other examples, a broken reference state may not be used, such that an intact weak reference is instead removed at operation 306. As a further example, an intact weak reference state may be indicated using at least a part of a data structure that is inadvertently reverted as part of a modification operation, such that a weak reference may be automatically cleared as a result of a modification operation (e.g., absent the operations of method 300). In some instances, operations 304 and 306 may further comprise locking the block while breaking the weak reference to ensure that another operation does not determine the weak reference is intact prior to operation 306 and subsequently access the block after it is modified by operation 308. As another example, a compare-and-swap operation may be used to update the metadata atomically.

Flow progresses to operation 308, where data is written to the block. In examples, writing data to the block and updating the metadata at operation 306 may not occur contemporaneously, such that, at least for a time, the system may be in a state where the data stored by the block has changed but the metadata still indicates an intact weak reference. Accordingly, journaling techniques may be used to indicate that block was written so as to mitigate file system inconsistencies that may result from an intervening failure. Additional discussion of such aspects is provided below with respect to method 400 of FIG. 4. Flow terminates at operation 308.

Returning to determination 304, if it is instead determined that the block does not have a weak reference, flow branches "NO" to operation 308, which was discussed above. Flow terminates at operation 308. It will be appreciated that, in other examples, aspects similar to those of method 300 may be performed in additional or alternative scenarios where a block is or is not modified. For example, an operation associated with changing a strong reference count (e.g., similar to operation 302) may cause a weak reference to be broken or removed (e.g., similar to operation 306) and file system metadata may be updated to reflect the changed strong reference count accordingly (e.g., similar to operation 308). Similar techniques may be applied in instances where an operation reduces a strong reference count or, more specifically, where an operation causes a strong reference count to decrease below "2" (e.g., a shared block is no longer shared or a block may be freed). Further, as noted above, breaking or removing a weak reference may additionally or alternatively be conditioned on modification of the block.

Figure 4:
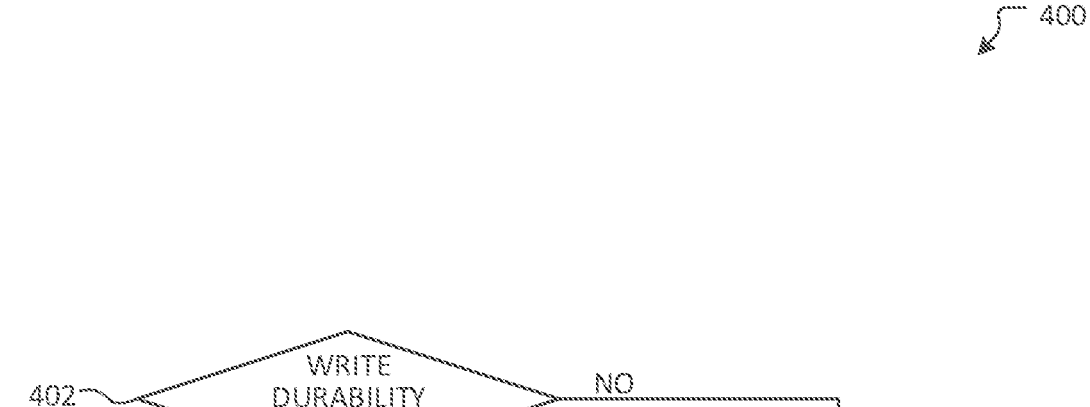
FIG. 4 illustrates an overview of an example method for restoring a file system state after a failure according to aspects of the present disclosure.
Figure 4:
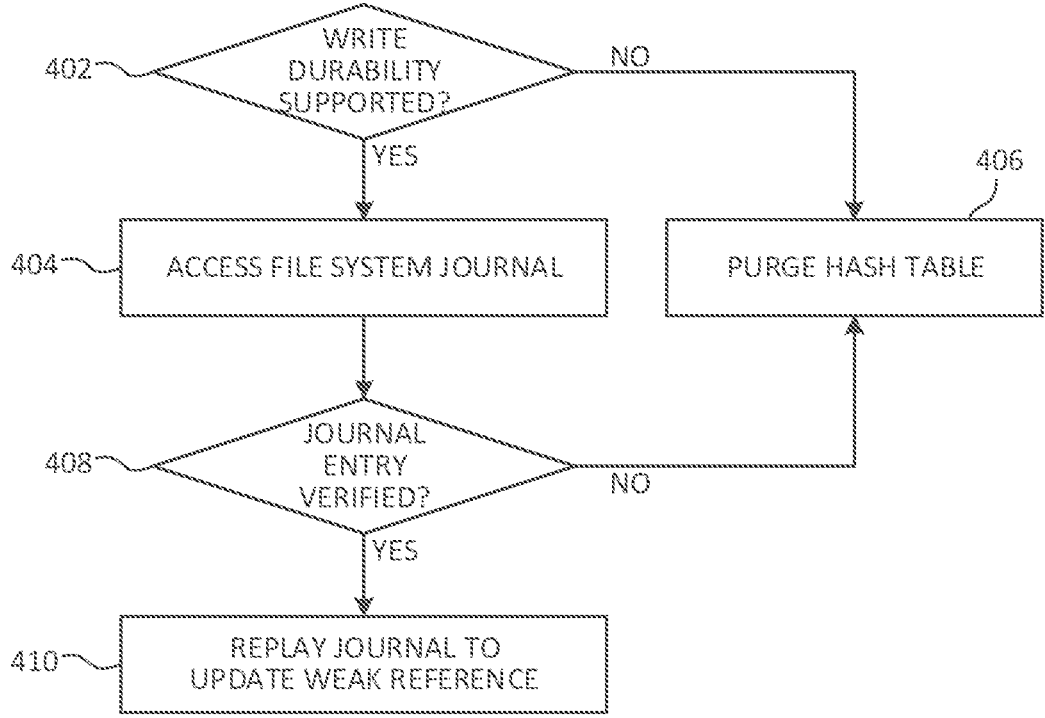

FIG. 4 illustrates an overview of an example method 400 for restoring a file system state relating to a weak reference after a failure according to aspects of the present disclosure. In examples aspects of method 400 are performed prior to performing aspects of methods 200 and 250 in FIGS. 2A and 2B, respectively. For example, method 400 may be performed after the occurrence of a failure.

As noted above, a block modification and an associated weak reference update may not be performed (e.g., written to storage) contemporaneously, such that an intervening failure may result in an inconsistent state. In such instances, relying on the now-incorrect weak reference may result in data corruption, if a new block is replaced with the recently rewritten block according to the deduplication aspects described herein.

As such, method 400 begins at determination 402, where it is determined whether write durability is supported by the data store (e.g., data store 114 in FIG. 1). For example, the determination may comprise evaluating one or more capabilities of the data store and/or hardware characteristics to determine whether the data store is capable of committing changes in the event of a failure. If it is determined that the data store does not support write durability, flow branches "NO" to operation 406, where at least a part of a deduplication hash table (e.g., deduplication hash table 112 in FIG. 1) may be purged so as to avoid incorrectly deduplicating data. Thus, if it cannot be determined that file system operations prior to the failure were properly journaled, at least a part of the hash table may be purged such that a deduplication engine (e.g., deduplication engine 112 in FIG. 1) does not inadvertently cause data corruption. Flow terminates at operation 406

If it is instead determined that the data store supports write durability, flow branches "YES" to operation 404, where a file system journal is accessed. In examples, a file system manager (e.g., file system manger 108 in FIG. 1) maintains a journal of operations that can be replayed in the event of a failure. For example, the journal may comprise an indication that operation 308 (and, in some instances, operation 306) of method 300 discussed above with respect to FIG. 3 were performed with respect to a block.

Flow progresses to determination 408, where it is determined whether the journal entry is verified. In examples, verification comprises generating a checksum of the entry and comparing the generated checksum to a stored checksum to determine whether the journal entry is corrupt. If the journal entry is not verified, flow branches "NO" to operation 406, where at least a part of the deduplication hash table is purged as described above. Flow terminates at operation 406.

By contrast, if it is determined that the journal entry is verified at determination 408, flow instead branches "YES" to operation 410, where the journal entry is replayed, thereby updating a weak reference associated with the block accordingly. In some instances, it may not be possible to determine whether the write to the block succeeded, such that retaining an intact weak reference on the block may be correct in instances where the write did not succeed, but incorrect in instances where the write did succeed. Thus, replaying the journal entry to break or otherwise remove an associated weak reference ensures that the block is not incorrectly used for deduplication, as may be the case when the write operation succeeded. Further, the deduplication hash table need not be purged and entries in the deduplication hash table accurately reflect the state of file system blocks. Flow terminates at operation 410.

FIGS. 5-8 and the associated descriptions provide a discussion of a variety of operating environments in which aspects of the disclosure may be practiced. However, the devices and systems illustrated and discussed with respect to FIGS. 5-8 are for purposes of example and illustration and are not limiting of a vast number of computing device configurations that may be utilized for practicing aspects of the disclosure, described herein.

Figure 5:
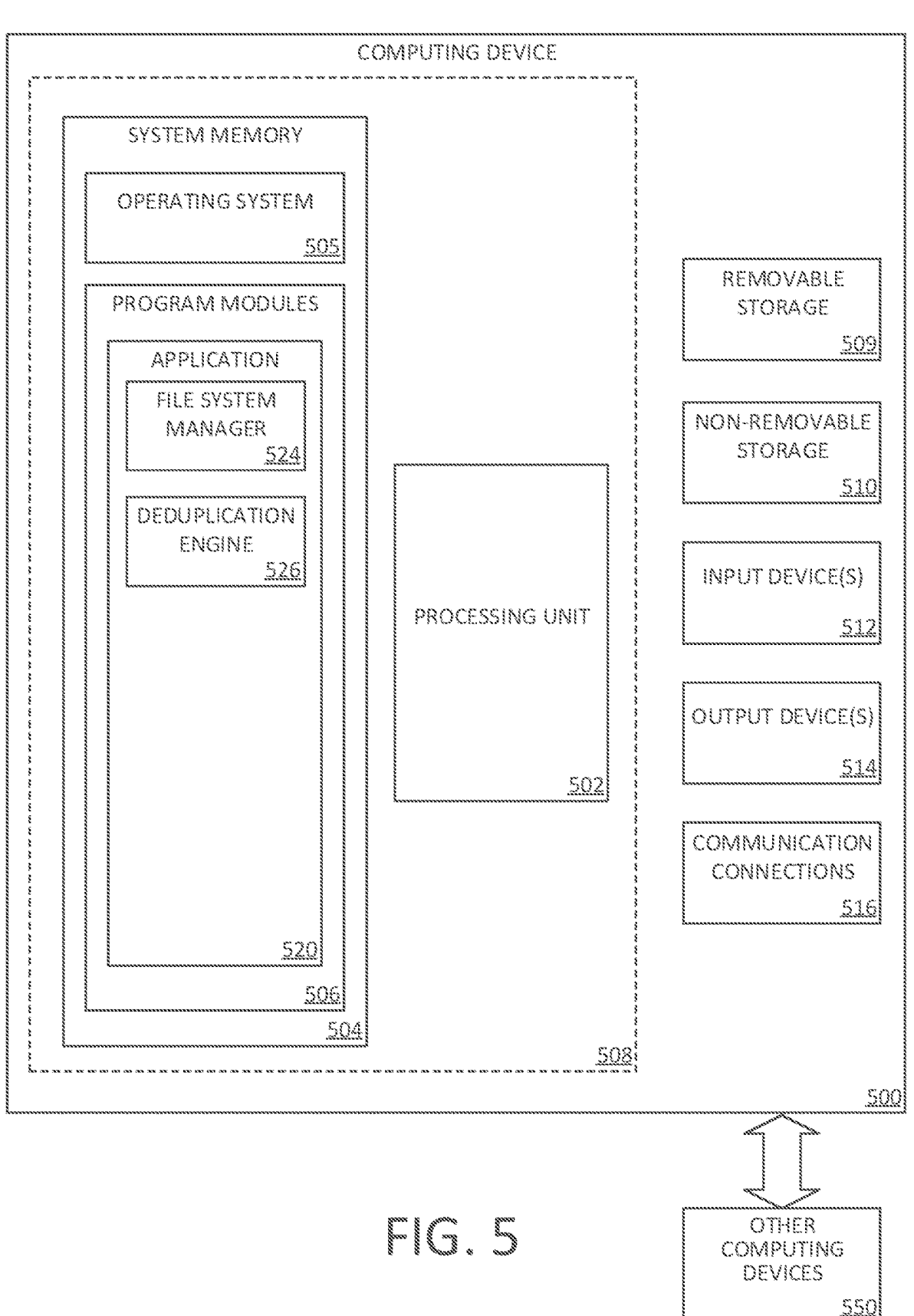
FIG. 5 is a block diagram illustrating example physical components of a computing device with which aspects of the disclosure may be practiced.

FIG. 5 is a block diagram illustrating physical components (e.g., hardware) of a computing device 500 with which aspects of the disclosure may be practiced. The computing device components described below may be suitable for the computing devices described above, including storage system 102 and computing device 104 in FIG. 1. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories.

The system memory 504 may include an operating system 505 and one or more program modules 506 suitable for running software application 520, such as one or more components supported by the systems described herein. As examples, system memory 504 may store file system manger 524 and deduplication engine 526. The operating system 505, for example, may be suitable for controlling the operation of the computing device 500.

Furthermore, embodiments of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., application 520) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 500 may also have one or more input device(s) 512 such as a keyboard, a mouse, a pen, a sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
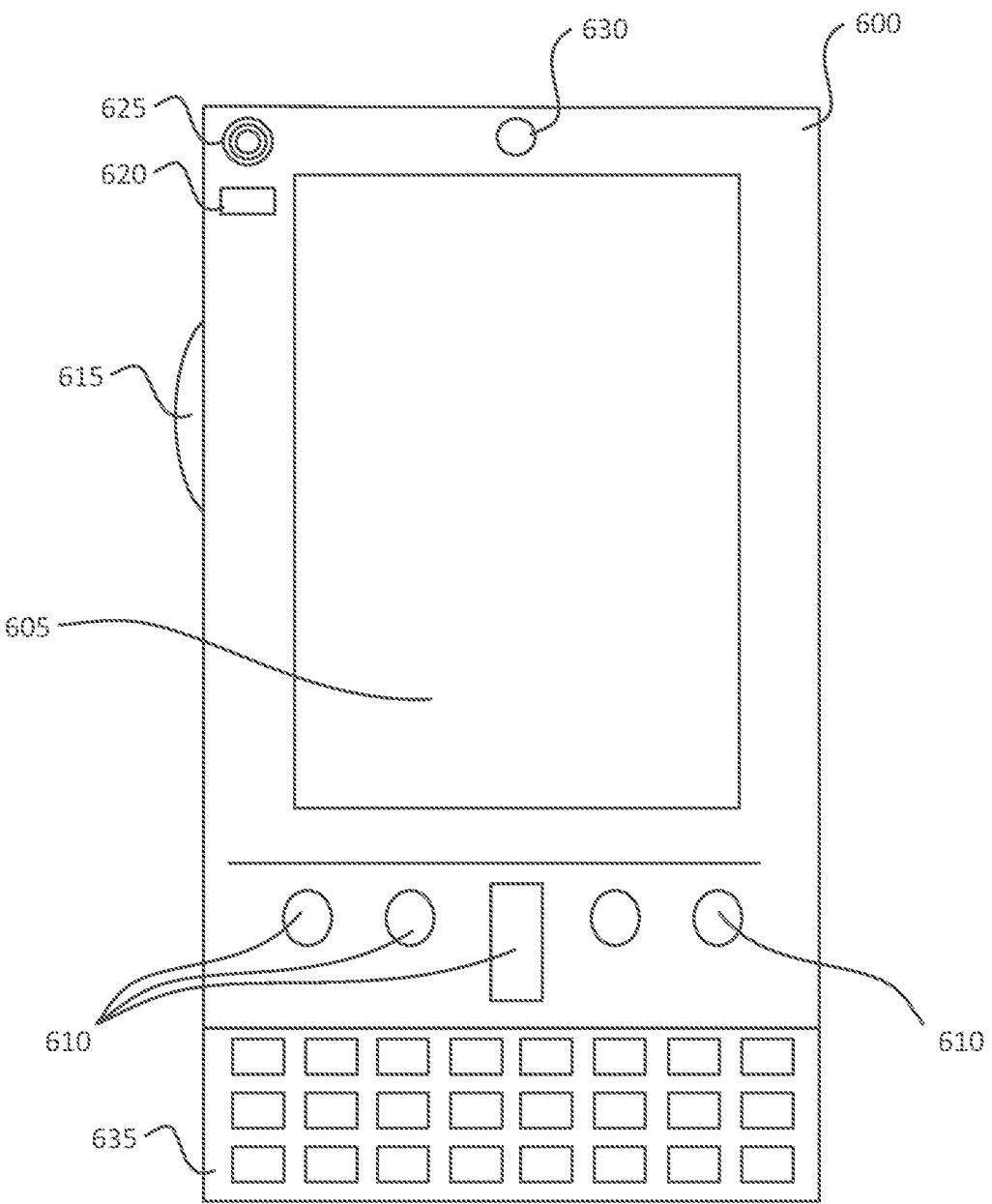
FIGS. 6A and 6B are simplified block diagrams of a mobile computing device with which aspects of the present disclosure may be practiced.
Figure 6B:
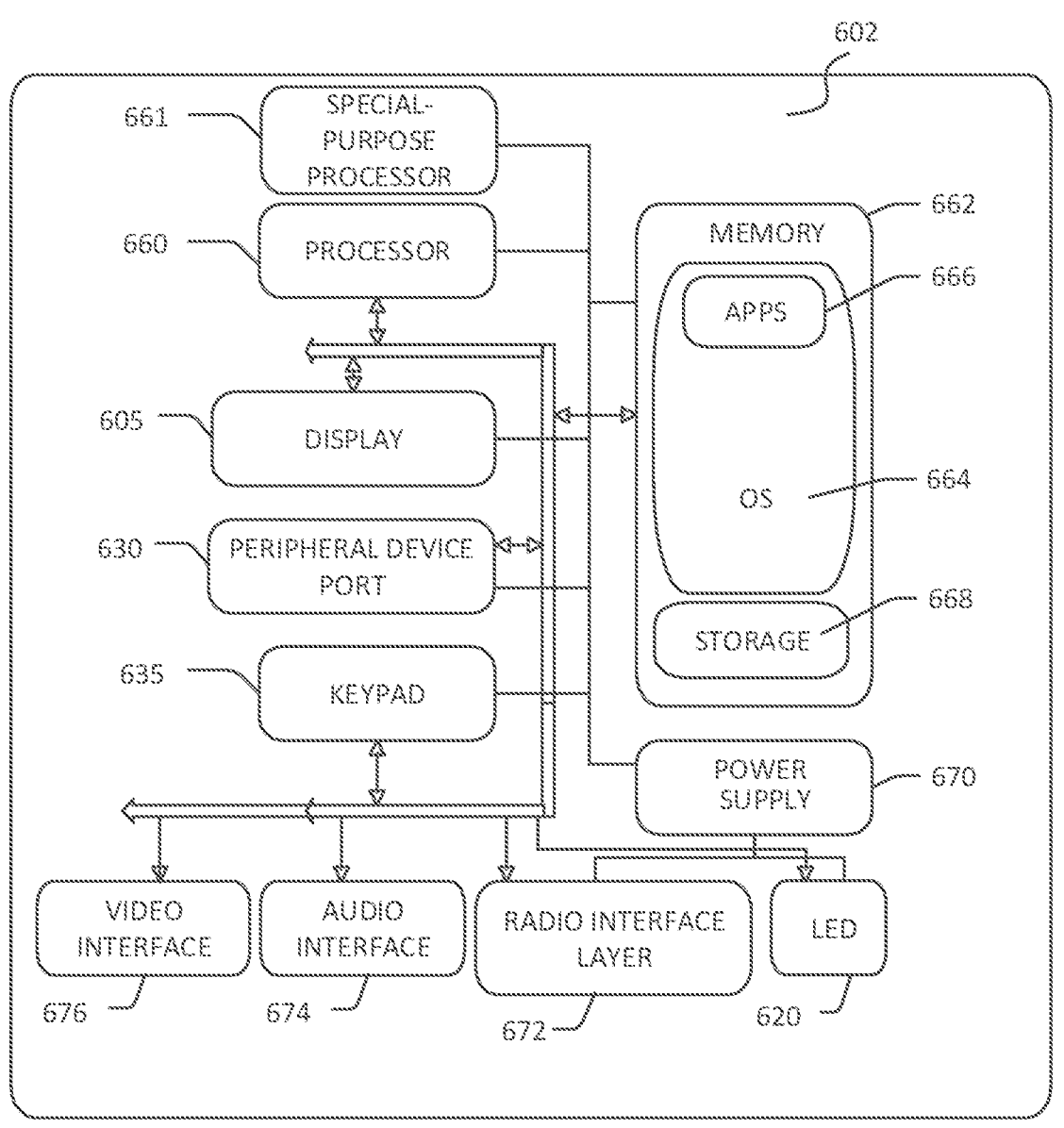

FIGS. 6A and 6B illustrate a mobile computing device 600, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 6A, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display).

If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some embodiments.

In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display.

In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile computing device. That is, the mobile computing device 600 can incorporate a system (e.g., an architecture) 602 to implement some aspects. In one embodiment, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600 described herein (e.g., search engine, extractor module, relevancy ranking module, answer scoring module, etc.).

The system 602 has a power supply 670, which may be implemented as one or more batteries. The power supply 670 might further include an external power source, such as an AC adapter or a powered docking cradle that supplements or recharges the batteries.

The system 602 may also include a radio interface layer 672 that performs the function of transmitting and receiving radio frequency communications. The radio interface layer 672 facilitates wireless connectivity between the system 602 and the "outside world," via a communications carrier or service provider. Transmissions to and from the radio interface layer 672 are conducted under control of the operating system 664. In other words, communications received by the radio interface layer 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated embodiment, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with embodiments of the present disclosure, the microphone may also serve as an audio sensor to facilitate control of notifications, as will be described below. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio interface layer 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio interface layer 672 or via a distributed computing network. Similarly, such data/information may be readily transferred between computing devices for storage and use according to well-known data/information transfer and storage means, including electronic mail and collaborative data/information sharing systems.

Figure 7:
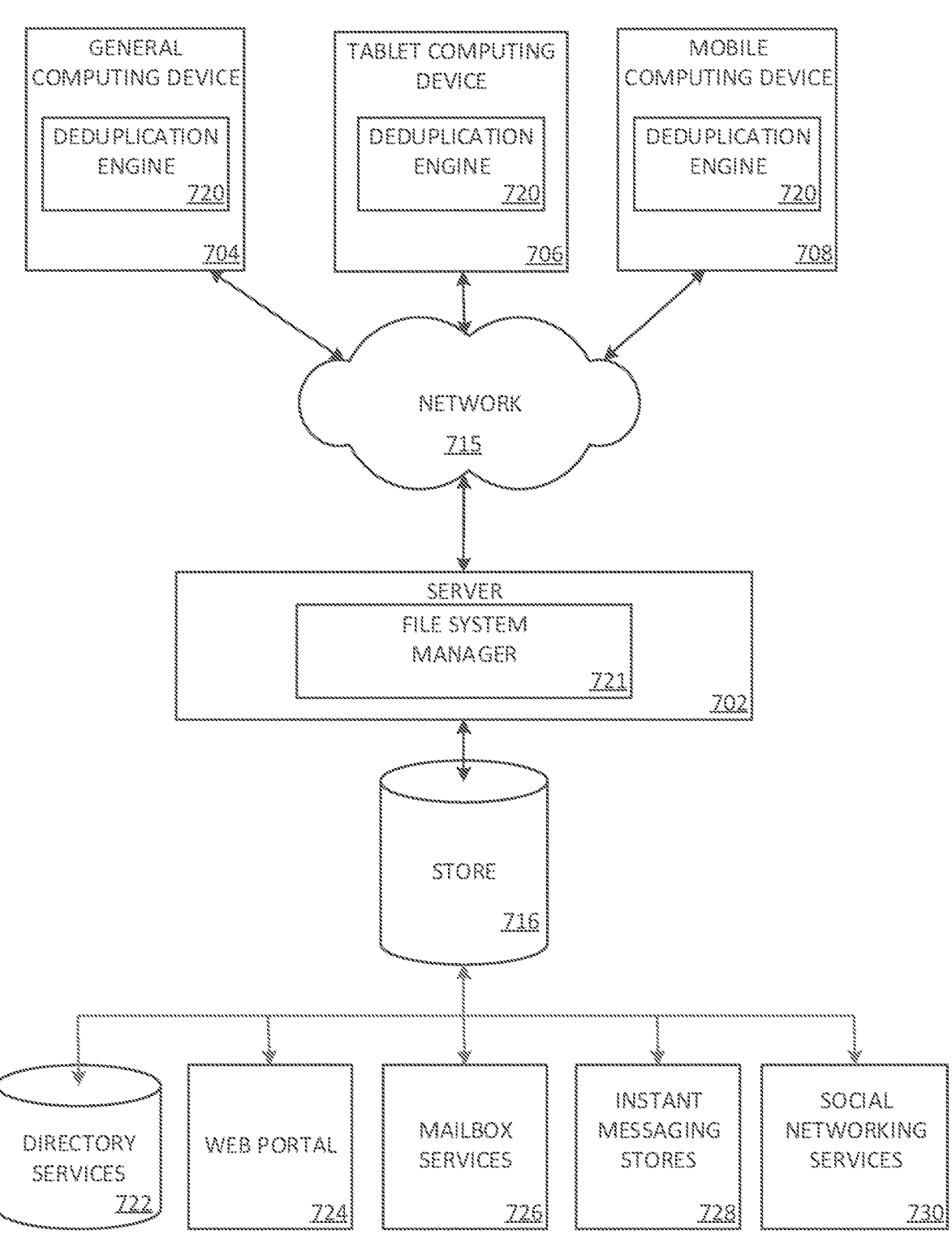
FIG. 7 is a simplified block diagram of a distributed computing system in which aspects of the present disclosure may be practiced.

FIG. 7 illustrates one aspect of the architecture of a system for processing data received at a computing system from a remote source, such as a personal computer 704, tablet computing device 706, or mobile computing device 708, as described above. Content displayed at server device 702 may be stored in different communication channels or other storage types. For example, various documents may be stored using a directory service 722, a web portal 724, a mailbox service 726, an instant messaging store 728, or a social networking site 730.

A deduplication engine 720 may be employed by a client that communicates with server device 702, and/or file system manager 721 may be employed by server device 702. The server device 702 may provide data to and from a client computing device such as a personal computer 704, a tablet computing device 706 and/or a mobile computing device 708 (e.g., a smart phone) through a network 715. By way of example, the computer system described above may be embodied in a personal computer 704, a tablet computing device 706 and/or a mobile computing device 708 (e.g., a smart phone). Any of these embodiments of the computing devices may obtain content from the store 716, in addition to receiving graphical data useable to be either pre-processed at a graphic-originating system, or post-processed at a receiving computing system.

Figure 8:
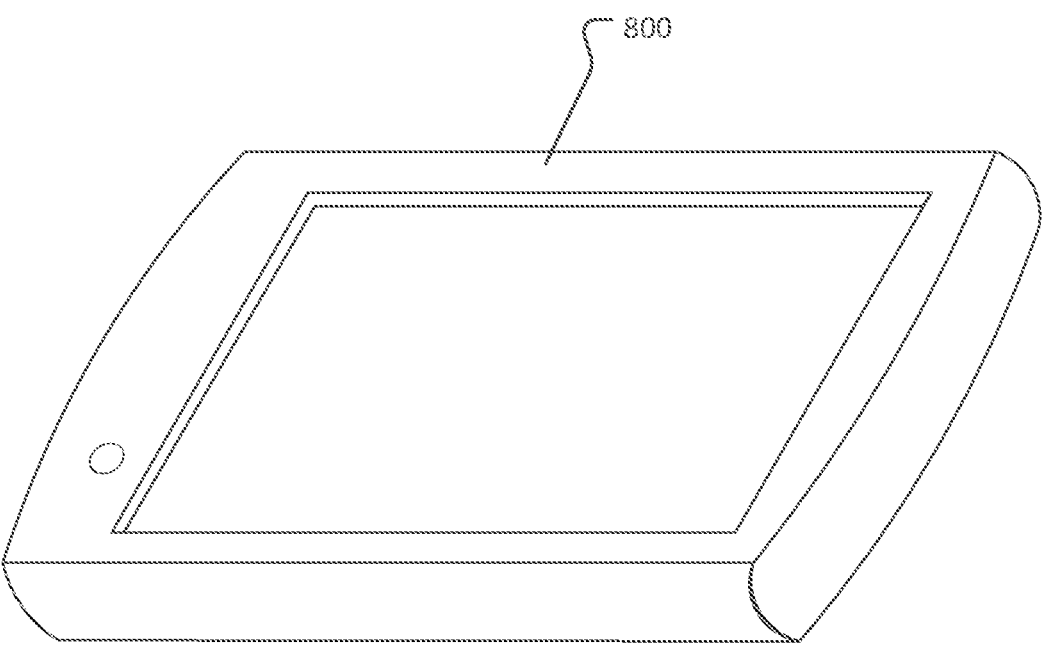
FIG. 8 illustrates a tablet computing device for executing one or more aspects of the present disclosure.

FIG. 8 illustrates an exemplary tablet computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one aspect of the technology relates to a system comprising: at least one processor; and memory storing instructions that, when executed by the at least one processor, causes the system to perform a set of operations. The set of operations comprises: generating a weak reference on a first block of a file system; generating, for the first block, an entry in a deduplication hash table comprising a block hash and a block location; identifying a second block having a block hash that matches the block hash for the first block in the deduplication hash table; determining whether the weak reference on the first block is intact; and based on determining that the weak reference on the first block is intact: generating, based on the block location of the entry in the deduplication hash table, a strong reference to the first block; and storing the strong reference to the first block as metadata for a file associated with the second block. In an example, generating the weak reference on the first block comprises updating a reference count data structure associated with the first block to indicate an intact weak reference state; and determining whether the weak reference on the first block is intact comprises accessing the reference count data structure. In another example, generating the weak reference on the first block comprises providing an indication to a file system manager to generate the weak reference on the first block; and determining whether the weak reference on the first block is intact comprises requesting, from the file system manger, a weak reference state associated with the first block. In a further example, the set of operations further comprises: based on determining that the weak reference on the first block is not intact, storing a strong reference to the second block as metadata for the file. In yet another example, the reference count data structure comprises: a first subpart associated with the intact weak reference state; and a second subpart associated with a strong reference count. In a further still example, the set of operations further comprises: receiving an indication of an intent to modify the first block; and in response to the indication, breaking the weak reference on the first block. In another example, determining whether the weak reference on the first block is intact further comprises determining whether a weak reference on the second block is intact, and the set of operations further comprises: based on determining that at least one of the weak reference on the first block is not intact or the weak reference on the second block is not intact, storing a strong reference to the second block as metadata for the file. In a further example, the set of operations further comprises: before generating the weak reference on the first block, determining the first block is associated with a broken weak reference; and based on determining the first block is associated with the broken weak reference, removing a stale entry from the deduplication hash table associated with the first block.

In another aspect, the technology relates to a method for deduplicating data of a file system. The method comprises: generating a weak reference on a first block of the file system, wherein the weak reference is in an intact weak reference state; generating, for the first block, an entry in the deduplication hash table; identifying a second block having a block hash that matches the entry in the deduplication hash table, wherein the second block is associated with a file of the file system; determining whether the weak reference on the first block is in the intact weak reference state; and based on determining that the weak reference is not in the intact weak reference state, using the second block to represent the file of the file system. In an example, the method further comprises: based on determining that the weak reference is in a broken weak reference state, removing the entry for the first block from the deduplication hash table. In another example, generating the weak reference on the first block comprises updating a reference count data structure associated with the first block to indicate an intact weak reference state; and determining whether the weak reference on the first block is intact comprises accessing the reference count data structure. In a further example, generating the weak reference on the first block comprises providing an indication to a file system manager to generate the weak reference on the first block; and determining whether the weak reference on the first block is intact comprises requesting, from the file system manger, a weak reference state associated with the first block.

In a further aspect, the technology relates to a method for deduplicating data of a file system. The method comprises: determining that a first weak reference on a first block of the file system is in a broken weak reference state; based on determining the first weak reference is in a broken weak reference state, removing, from a deduplication hash table, a first entry associated with the first block; generating a second weak reference on the first block, wherein the second weak reference is in an intact weak reference state; generating, for the first block, a second entry in the deduplication hash table; identifying a second block having a block hash that matches the second entry in the deduplication hash table; locking the first block and the second block of the file system; determining whether the first weak reference and the second weak reference are in the intact weak reference state; based on determining that the first weak reference and the second weak reference are in the intact weak reference state, using the first block in place of the second block to represent a file of the file system; and unlocking the first block and the second block of the file system. In an example, using the first block in place of the second block to represent the file comprises: generating, based on the second entry in the deduplication hash table, a strong reference to the first block; and storing the strong reference to the first block as metadata for the file of the file system. In another example, generating the second weak reference on the first block comprises updating a reference count data structure associated with the first block to indicate the intact weak reference state; and determining whether the second weak reference is in the intact weak reference state comprises accessing the reference count data structure. In a further example, the first block in place of the second block to represent the file comprises providing an indication to a file system manager to use the first block in place of the second block to represent the file. In yet another example, generating the second weak reference on the first block comprises providing an indication to a file system manager to generate the weak reference on the first block; and determining whether the second weak reference is in the intact weak reference state comprises requesting, from the file system manger, a weak reference state associated with the first block. In a further still example, the method further comprises: receiving, while the first block is locked, a modification operation for a file associated with the first block; and allocating a third block associated with the file for the modification operation. In another example, reference count data structure comprises: a first subpart associated with a weak reference state; and a second subpart associated with a strong reference count. In yet another example, the first subpart indicates a weak reference state selected from the group consisting of: the intact weak reference state; a broken weak reference state; and a no weak reference state.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
at least one processor; and
memory storing instructions that, when executed by the at least one processor, causes the system to perform a set of operations, the set of operations comprising:
    generating a weak reference on a first block of a file system, wherein the weak reference stores an association between a block location of the first block and a state of the first block upon generation of the weak reference;
    generating, for the first block, an entry in a deduplication hash table comprising a block hash and the block location;
    identifying a second block having a block hash that matches the block hash for the first block in the deduplication hash table;
    determining whether the weak reference on the first block is intact; and based on determining that the weak reference on the first block is intact, thereby indicating that data of the first block has not been modified:
        generating, based on the block location of the entry in the deduplication hash table, a strong reference to the first block to replace the weak reference on the first block in the deduplication hash table, wherein the strong reference indicates the first block is part of a first file; and
        storing the strong reference to the first block as metadata for a second file associated with the second block.

2. The system of claim 1, wherein:
generating the weak reference on the first block comprises updating a reference count data structure associated with the first block to indicate an intact weak reference state; and
determining whether the weak reference on the first block is intact comprises accessing the reference count data structure.

3. The system of claim 1, wherein:
generating the weak reference on the first block comprises providing an indication to a file system manager to generate the weak reference on the first block; and
determining whether the weak reference on the first block is intact comprises requesting, from the file system manger, a weak reference state associated with the first block.

4. The system of claim 1, wherein the set of operations further comprises:
based on determining that the weak reference on the first block is not intact, thereby indicating that the data of the first block has been modified, storing a strong reference to the second block as metadata for the second file.

5. The system of claim 2, wherein the reference count data structure comprises:
a first subpart associated with the intact weak reference state; and
a second subpart associated with a strong reference count.

6. The system of claim 4, wherein the set of operations further comprises:
receiving an indication of an intent to modify the first block; and
in response to the indication, breaking the weak reference on the first block.

7. The system of claim 1, wherein determining whether the weak reference on the first block is intact further comprises determining whether a weak reference on the second block is intact, and wherein the set of operations further comprises:
based on determining that at least one of the weak reference on the first block is not intact or the weak reference on the second block is not intact, storing a strong reference to the second block as metadata for the second file.

8. The system of claim 1, wherein the set of operations further comprises:
before generating the weak reference on the first block, determining the first block is associated with a broken weak reference; and
based on determining the first block is associated with the broken weak reference, removing a stale entry from the deduplication hash table associated with the first block.

9. A method for deduplicating data of a file system, the method comprising:

generating a weak reference on a first block of the file system, wherein the weak reference is in an intact weak reference state, and wherein the weak reference is an entry in a data structure that stores an association between a block location of the first block and a state of the first block upon generation of the weak reference;

generating, for the first block, an entry in a deduplication hash table;

identifying a second block having a block hash that matches the entry in the deduplication hash table, wherein the second block is associated with a file of the file system;

determining whether the weak reference on the first block is in the intact weak reference state, thereby indicating that data of the first block has not been modified;

based on determining that the weak reference is not in the intact weak reference state, using the second block to represent the file of the file system;

identifying a third block having a block hash that matches the block hash for the second block; and based on determining a weak reference for the second block is intact, replacing the weak reference for the second block with a strong reference in the deduplication hash table to indicate the second block is used to represent a file comprising the third block.

10. The method of claim 9, further comprising:

based on determining that the weak reference is in a broken weak reference state, removing the entry for the first block from the deduplication hash table.

11. The method of claim 9, wherein:

generating the weak reference on the first block comprises updating a reference count data structure associated with the first block to indicate an intact weak reference state; and determining whether the weak reference on the first block is intact comprises accessing the reference count data structure.

12. The method of claim 9, wherein:

generating the weak reference on the first block comprises providing an indication to a file system manager to generate the weak reference on the first block; and determining whether the weak reference on the first block is intact comprises requesting, from the file system manger, a weak reference state associated with the first block.

13. A method for deduplicating data of a file system, the method comprising:

determining that a first weak reference on a first block of the file system is in a broken weak reference state;

based on determining the first weak reference is in a broken weak reference state, removing, from a deduplication hash table, a first entry associated with the first block;

generating a second weak reference on the first block, wherein the second weak reference is in an intact weak reference state;

generating, for the first block, a second entry in the deduplication hash table, wherein the second entry stores the second weak reference and the deduplication hash table stores an association between a block location of the first block and a state of the first block upon generation of the second weak reference;

identifying a second block having a block hash that matches the second entry in the deduplication hash table;

locking the first block and the second block of the file system;

determining whether the first weak reference and the second weak reference are in the intact weak reference state;

based on determining that the first weak reference and the second weak reference are in the intact weak reference state, thereby indicating that data of the first block of the first weak reference has not been modified, using the first block in place of the second block to represent a file of the file system and replacing the first weak reference with a strong reference to the first block; and unlocking the first block and the second block of the file system.

14. The method of claim 13, wherein:

generating the second weak reference on the first block comprises updating a reference count data structure associated with the first block to indicate the intact weak reference state; and determining whether the second weak reference is in the intact weak reference state comprises accessing the reference count data structure.

15. The method of claim 13, wherein using the first block in place of the second block to represent the file comprises providing an indication to a file system manager to use the first block in place of the second block to represent the file.

16. The method of claim 13, wherein:

generating the second weak reference on the first block comprises providing an indication to a file system manager to generate the weak reference on the first block; and determining whether the second weak reference is in the intact weak reference state comprises requesting, from the file system manger, a weak reference state associated with the first block.

17. The method of claim 13, further comprising:

receiving, while the first block is locked, a modification operation for a file associated with the first block; and allocating a third block associated with the file for the modification operation.

18. The method of claim 14, wherein the reference count data structure comprises:

a first subpart associated with a weak reference state; and a second subpart associated with a strong reference count.

19. The method of claim 18, wherein the first subpart indicates a weak reference state selected from the group consisting of:

the intact weak reference state;

a broken weak reference state; and a no weak reference state.

20. The method of claim 9, further comprising:

based on determining the weak reference for the second block is intact, storing the strong reference to the second block as metadata for the file comprising the third block.

* * * * *